(No Model.)
E. A. BYE & O. MOSSBERG.
DIVIDERS.
No. 540,809. Patented June 11, 1895.
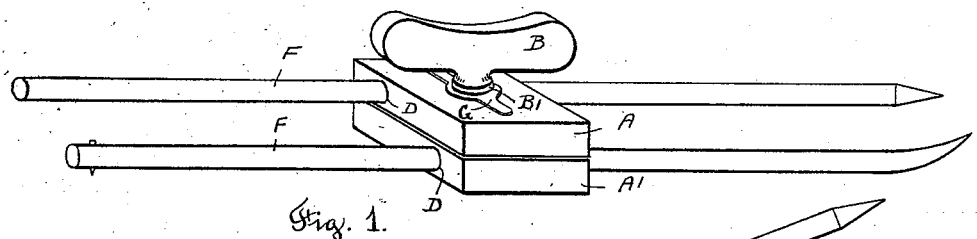
Fig. 1.
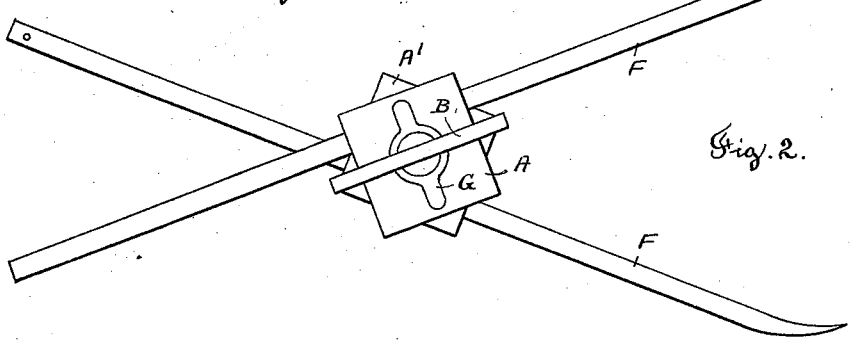
Fig. 2.
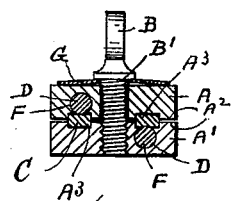   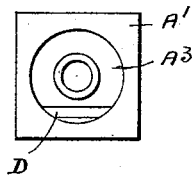   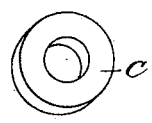
Fig. 3.   Fig. 4.   Fig. 5.
Witnesses
O. C. Whiting
H. M. Fowler
Inventors
Erick A. Bye
Oscar Mossberg
By their Attorney
Rufus B. Fowler

United States Patent Office.

ERICK A. BYE AND OSCAR MOSSBERG, OF FITCHBURG, MASSACHUSETTS.

DIVIDERS.

SPECIFICATION forming part of Letters Patent No. 540,809, dated June 11, 1895.

Application filed October 19, 1894. Serial No. 526,415. (No model.)

*To all whom it may concern:*

Be it known that we, ERICK A. BYE and OSCAR MOSSBERG, citizens of Sweden and Norway, residing at Fitchburg, in the county of Worcester and State of Massachusetts, have invented a new and useful Improvement in Dividers, of which the following is a specification, reference being had to the accompanying drawings, forming a part of the same, and in which—

Figure 1 represents in perspective view a pair of dividers embodying our invention. Fig. 2 is a top view of the same with the legs of the divider open. Fig. 3 is a central sectional view through the clamping-plates and transversely to the legs of the divider. Fig. 4 represents the recessed surface of one of the clamping-plates, and Fig. 5 shows a perspective view of the annular washer interposed between the plates.

Similar letters refer to similar parts in the different figures.

Our invention relates to that class of dividers which consists of one or more blocks, or plates, forming the body of the divider in which the legs of the divider are adjustably held and it has for its object to render the instrument more efficient in use and cheaper in construction.

Referring to the accompanying drawings A, A' denote two rectangular plates placed one above the other and held together by a binding thumb-screw B, which passes through a plain hole in the plate A and enters a screw threaded hole in the plate A'. The inner or opposing faces $A^2$, $A^2$ of the plates A, A' are provided with circular recesses $A^3$, as represented in Figs. 3 and 4, to receive an annular washer C whose thickness is slightly greater than the combined depths of the recesses $A^3$ in the two plates A, A' so that when the annular washer C is interposed between the plates A, A' the two plates A, A' will be held slightly apart as represented in sectional view in Fig. 3, thereby removing all friction between the opposing surfaces of the plates A, A' and causing the plates to turn easily upon the washer C as they are rotated about the binding screw B.

Each of the plates A, A' is provided with a hole D extending through the plate and parallel with its side to receive the legs F, F. The holes D are preferably placed at equal distances from and upon opposite sides of the axis of the binding screw B and they communicate with the recesses $A^3$ so the sides of the annular washer C will rest upon and be pressed against the legs F, F as the two plates A, A' are drawn together by the binding screw B. The binding screw B is provided with a shoulder B' between which, and the outer surface of the plate A, is an elastic washer G in order to produce a yielding pressure between the plates A, A' whenever the binding screw is tightened. A slight loosening of the thumb-screw B serves to release the plates so they will turn freely upon the washer C in order to vary the angle of the legs without loosening the legs within the plates sufficiently to allow them to move longitudinally.

The two plates A and A' are exact duplicates of each other and the entire device forms an extremely convenient and efficient tool which can be used as a divider or as an outside or inside caliper by a substitution of legs suitable for that purpose in the place of those represented in the accompanying drawings and the entire device is cheaply constructed.

What we claim as our invention, and desire to secure by Letters Patent, is—

In a divider, the combination of a pair of plates A and A' provided upon their opposing faces with circular recesses $A^3$, annular washer C held in said recesses by which said plates are slightly separated, legs held in said plates and in contact with said washer and a binding screw B by which said plates and washer are clamped together, substantially as described.

Dated this 11th day of October, 1894.

ERICK A. BYE.
OSCAR MOSSBERG.

Witnesses:
RUFUS B. FOWLER,
EMMA KESTER.